A. F. KUHNEN.
WAGON STAKE.
APPLICATION FILED MAY 7, 1917.
1,266,692.
Patented May 21, 1918.
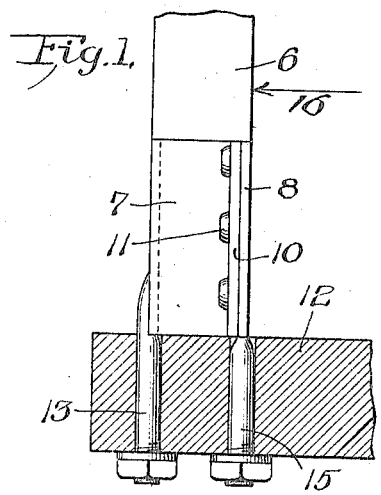
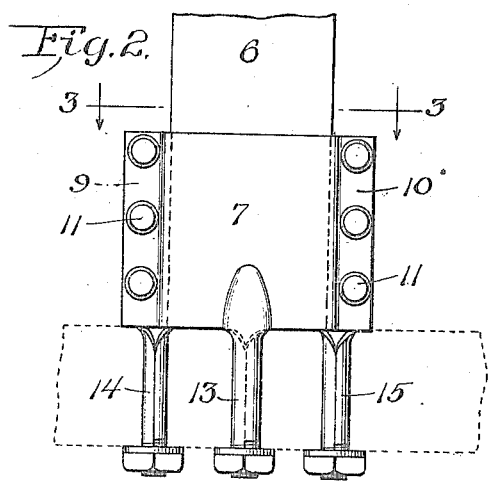
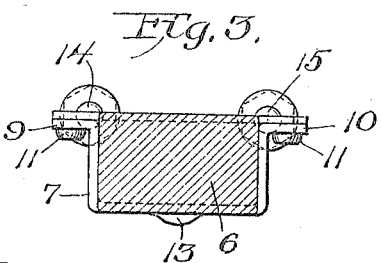
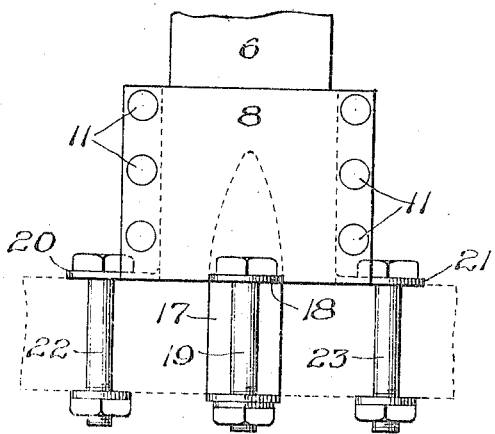
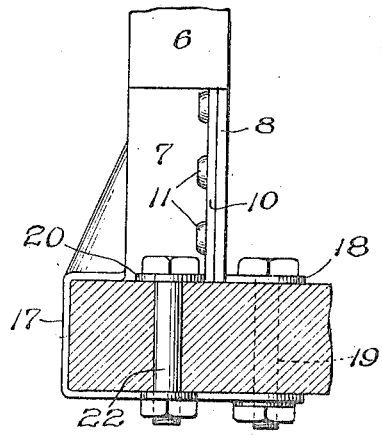
Witness:
Harry S. Gather
Inventor
Alexander F. Kuhnen
by
Attys.

UNITED STATES PATENT OFFICE.

ALEXANDER F. KUHNEN, OF DIXON, ILLINOIS, ASSIGNOR TO AMERICAN WAGON COMPANY, OF CHICAGO, ILLINOIS, A CORPORATION OF ILLINOIS.

WAGON-STAKE.

1,266,692.   Specification of Letters Patent.   Patented May 21, 1918.

Application filed May 7, 1917. Serial No. 166,929.

*To all whom it may concern:*

Be it known that I, ALEXANDER F. KUHNEN, a citizen of the United States, residing at Dixon, in the county of Lee and State of Illinois, have invented certain new and useful Improvements in Wagon-Stakes, of which the following is a specification.

The present invention has to do with certain improvements in side stakes for wagon bodies, such as trucks, vans, and the like. These stakes stand along the sides of the wagon or truck floor, to which they are attached. The only point of support or attachment of the stakes to the floor is at their lower ends. This makes is desirable to provide a very strong and durable connection between the lower end of each stake and the wagon or truck floor, as otherwise the stakes will soon begin to lean and will not securely hold trunks, packages, and the like, on the truck. On account of the fact that the only point of support for each stake is at its lower end, it has, in the past, been found to be very difficult, if not impossible, to securely mount the stakes except by the use of some form of permanent mounting. A permanent mounting or connection can only be properly made at the factory where the wagon or truck is constructed, and, therefore, it has been necessary to ship the wagon or truck floors with the side stakes already permanently secured in place.

It will be readily apparent that this is a very undesirable and an expensive way of shipping the wagon bodies, because of their very bulky nature when the stakes are in place. It is possible to pack into a car for shipment several times as many wagon bodies with the stakes removed, as it is possible to place in the same car wagon bodies with the stakes in place. Consequently, it is very desirable from the standpoint of cost of shipment to be able to ship the bodies with the stakes removed. In order to do this, however, it is necessary to provide a stake of such form and construction that the same can be readily attached to the wagon body without the use of special machinery or tools and without the necessity of employing especially trained labor, while at the same time making a solid and successful connection.

The main object of the present invention is to provide a construction of stake such that it can be readily attached to the wagon bed or body in a very firm and secure manner without the use of special machinery or attaching tools, and without the use of highly skilled labor. Another object in this connection is to so construct the stake that its lower end will be greatly reinforced and strengthened, so that, when it is in place, it will be very durable and permanent.

Other objects and uses will appear from a detailed description of the invention which consists in the features of construction and combinations of parts hereinafter described and claimed.

Referring to the drawing:

Figure 1 shows a side elevation of the lower portion of a stake having applied thereto a simple form of the attaching means to which the present invention relates, said stake being connected to the side sill of the wagon body;

Fig. 2 shows a face view similar to Fig. 1;

Fig. 3 shows a section taken on the line 3—3 of Fig. 2, looking in the direction of the arrows;

Fig. 4 shows a view corresponding to Fig. 1 of a modified form of construction; and Fig. 5 shows a face view corresponding to Fig. 4.

The use of any attaching means in which it is necessary to drill or bore through the stake is very undesirable, because the removal of the material drilled or bored out in itself weakens the stake, and also because there will be a tendency for the stake to split through the hole thus formed. It is, therefore, desirable to attach the stake by inserting its lower end into a sleeve or socket. When this sleeve or socket constitutes a portion of the wagon bed or body, the stake cannot be firmly or securely entered thereinto except at the factory, because a tight connection cannot be made except by the use of special machinery or tools. Consequently, if the sockets be permanently attached to the wagon bed and the stakes be removable from the sockets, with the intention that the stakes may be inserted into the sockets by the purchaser or at the destination, it will be found that the stakes so inserted soon become loose and wabbly, and that the stakes tilt or lean into different positions.

In practising the features of the present invention, I permanently attach a suitable socket or sleeve to the lower portion of the stake in such a secure and permanent manner that said sleeve or socket becomes, in effect, a permanent portion of the stake, reinforcing the lower portion of the stake and giving it added strength, as well as providing a means for attaching the stake to the wagon bed. By the use of this construction, the sleeves or sockets can be permanently attached to the stakes at the factory, and inasmuch as said sleeves or sockets are so constructed that they can be readily attached to the wagon bed without the use of special tools or machinery, it becomes possible to attach these removable stakes to the wagon beds in such a secure and firm manner that all of the foregoing disadvantages of a removable stake are eliminated and the advantages possible from the use of removable stakes are gained.

Referring now to the drawing, I will first describe the construction shown in Figs. 1, 2, and 3. In this case the numeral 6 designates the lower portion of the stake. A socket is securely and permanently mounted on the lower portion of the stake, said socket comprising, in the form shown, a U-shaped plate 7 and a flat back plate 8. The U-shaped plate is flanged to provide the flanges 9 and 10, which flanges are attached to the edges of the flat plate 8 in any suitable manner as by the use of rivets 11. The lower portion of the stake may be recessed an amount approximately amounting to the thickness of the sleeve, or slightly less than such thickness. The U-shaped plate 7 and the flat plate 8, when drawn together by the rivets 11, will grip the lower portion of the stake in a very secure manner, and by the use of machinery of proper construction, it will be possible to secure such a firm connection that the stake cannot be removed from the sleeve without destruction of one or the other of said parts.

The sleeve may be provided with suitable means for attachment to the wagon bed or body. The side sill of said wagon bed is designated by the numeral 12 in Fig. 1. In the construction shown in Figs. 1, 2, and 3, the U-shaped plate is provided with a central integrally threaded pin 13, and the flat plate 8 is provided with the side integrally threaded pins 14 and 15. All of these pins are conveniently formed from lugs integral with the plates themselves, which lugs are folded or rolled over into the form shown and are then threaded. The side sill of the wagon bed is bored or drilled to receive these pins which are secured in position by nuts or the like.

It is to be observed that the pressure exerted on the stake is in the direction of the arrow 16 of Fig. 1. Consequently the inner edge of the lower end of the stake and sleeve are under tension, whereas the outer edge of said parts is under compression. By providing two pins 14 and 15 on the flat plate 18, a maximum of strength is provided for resisting the tension thus exerted.

In the construction shown in Figs. 4 and 5, a U-shaped lug or extension 17 is carried out from one of the sleeve plates and extended around and underneath the wagon sill. A lug 18 is provided on the flat plate corresponding in location to the U-shaped lug 17, so that a bolt 19 may be extended through these parts in order to lock them together. Also, if desired, the lugs 20 and 21 may be brought out from the side portions of one of the plates for the reception of the bolts 22 and 23.

The construction just described will be found to be very desirable for use in connection with certain types of wagon bodies in which it is not possible to drill holes at the proper points for the accommodation of the pins 13, 14, and 15, shown in Figs. 1, 2, and 3.

Furthermore, in many cases it would be undesirable to drill the wagon sill at certain points because of the danger of unduly weakening the same, and in such cases the use of the U-shaped strap 17 will be found to be very advantageous and desirable.

The U-shaped lug 17 might be eliminated from the construction shown in Figs. 4 and 5, leaving the lugs 18, 20, and 21, and this construction in itself would be a very desirable and satisfactory one for use in many cases.

While I have herein shown and described only certain forms of construction embodying the features of my invention, still I do not limit myself to the same, except as I may do so in the claims.

I claim:

1. As a new article of manufacture, a wagon stake comprising a wooden rod and a two part metal sleeve on the lower end of said rod, rivets joining together the parts of said sleeve and serving to clamp them onto the stake, and a plurality of downwardly depending threaded pins integrally formed with the sections of said sleeve, whereby the rod and sleeve are rigidly joined together and constitute a unitary wooden wagon stake with suitable attaching means on its lower end, substantially as described.

2. As a new article of manufacture, a unitary wagon stake comprising a wooden rod and a metal sleeve on the lower end thereof, said metal sleeve comprising a U-shaped section and a flat plate riveted together on their edge portions and serving to rigidly clamp the rod between them, and suitable attaching means on said sleeve for rigid attachment to a wagon body, substantially as described.

3. As a new article of manufacture, a unitary wagon stake comprising a wooden rod and a metal sleeve on the lower end thereof, means for clamping said sleeve rigidly onto the rod, and means for rigidly connecting the sleeve to the wagon bed, substantially as described.

4. As a new article of manufacture, a unitary wagon stake comprising a wooden rod and a metal sleeve on the lower end thereof, and suitable attaching means on said sleeve for attachment to a wagon bed, the sleeve being rigidly mounted on the rod and being non-removable therefrom without destruction of the parts, substantially as described.

ALEXANDER F. KUHNEN.

Copies of this patent may be obtained for five cents each, by addressing the "Commissioner of Patents, Washington, D. C."